US012654198B2

(12) United States Patent
Oba et al.

(10) Patent No.: US 12,654,198 B2
(45) Date of Patent: Jun. 16, 2026

(54) SUBSTRATE-PROCESSING METHOD

(71) Applicant: Tokyo Electron Limited, Tokyo (JP)

(72) Inventors: Daisuke Oba, Albany, NY (US); Nobuo Matsuki, Yamanashi (JP); Yoshinori Morisada, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 18/920,078

(22) Filed: Oct. 18, 2024

(65) Prior Publication Data

US 2025/0144667 A1 May 8, 2025

(30) Foreign Application Priority Data

Nov. 7, 2023 (JP) ................................ 2023-190210

(51) Int. Cl.
*B05D 1/00* (2006.01)

(52) U.S. Cl.
CPC ..................................... *B05D 1/62* (2013.01)

(58) Field of Classification Search
CPC ........................................................ B05D 1/62
See application file for complete search history.

(56) References Cited

U.S. PATENT DOCUMENTS

2022/0235456 A1* 7/2022 Matsuki .............. C23C 16/4581

FOREIGN PATENT DOCUMENTS

JP 2022-099123 7/2022
JP 7183423 12/2022

* cited by examiner

*Primary Examiner* — Nathan T Leong
(74) *Attorney, Agent, or Firm* — IPUSA, PLLC

(57) ABSTRACT

A substrate-processing method includes a) forming a flowable oligomer on a substrate, the flowable oligomer containing carbon; and b) exposing the substrate to a plasma of a modification gas containing carbon and hydrogen, thereby modifying the flowable oligomer and forming a carbon-containing film.

14 Claims, 10 Drawing Sheets

SUBSTRATE-PROCESSING METHOD

CROSS-REFERENCE TO RELATED APPLICATIONS

This application is based upon and claims priority to Japanese Patent Application No. 2023-190210, filed on Nov. 7, 2023, the entire contents of which are incorporated herein by reference.

BACKGROUND

1. Field of the Invention

The present disclosure relates to a substrate-processing method.

2. Description of the Related Art

Japanese Patent No. 7183423 discloses a method of forming an insulating film. This disclosed method includes: reacting an oxygen-containing silicon compound gas with a non-oxidizing hydrogen-containing gas in a state in which at least the non-oxidizing hydrogen-containing gas is formed into a plasma, thereby forming a flowable silanol compound on a substrate; and annealing the substrate to form the silanol compound into an insulating film.

Japanese Unexamined Patent Publication No. 2022-99123 discloses a method of forming an insulating film containing nitrogen and/or carbon in a recess formed at the surface of a substrate. This disclosed method includes: forming a flowable film in the recess by supplying a processing gas to the substrate adjusted to a first temperature, the processing gas containing a precursor gas and a reducing gas and being activated by a plasma; and curing the flowable film by thermally treating the substrate at a second temperature that is higher than the first temperature.

SUMMARY

According to one aspect of the present disclosure, a substrate-processing method includes: a) forming a flowable oligomer on a substrate, the flowable oligomer containing carbon; and b) exposing the substrate to a plasma of a modification gas containing carbon and hydrogen, thereby modifying the flowable oligomer and forming a carbon-containing film.

DETAILED DESCRIPTION OF THE DISCLOSURE

Figure 1:
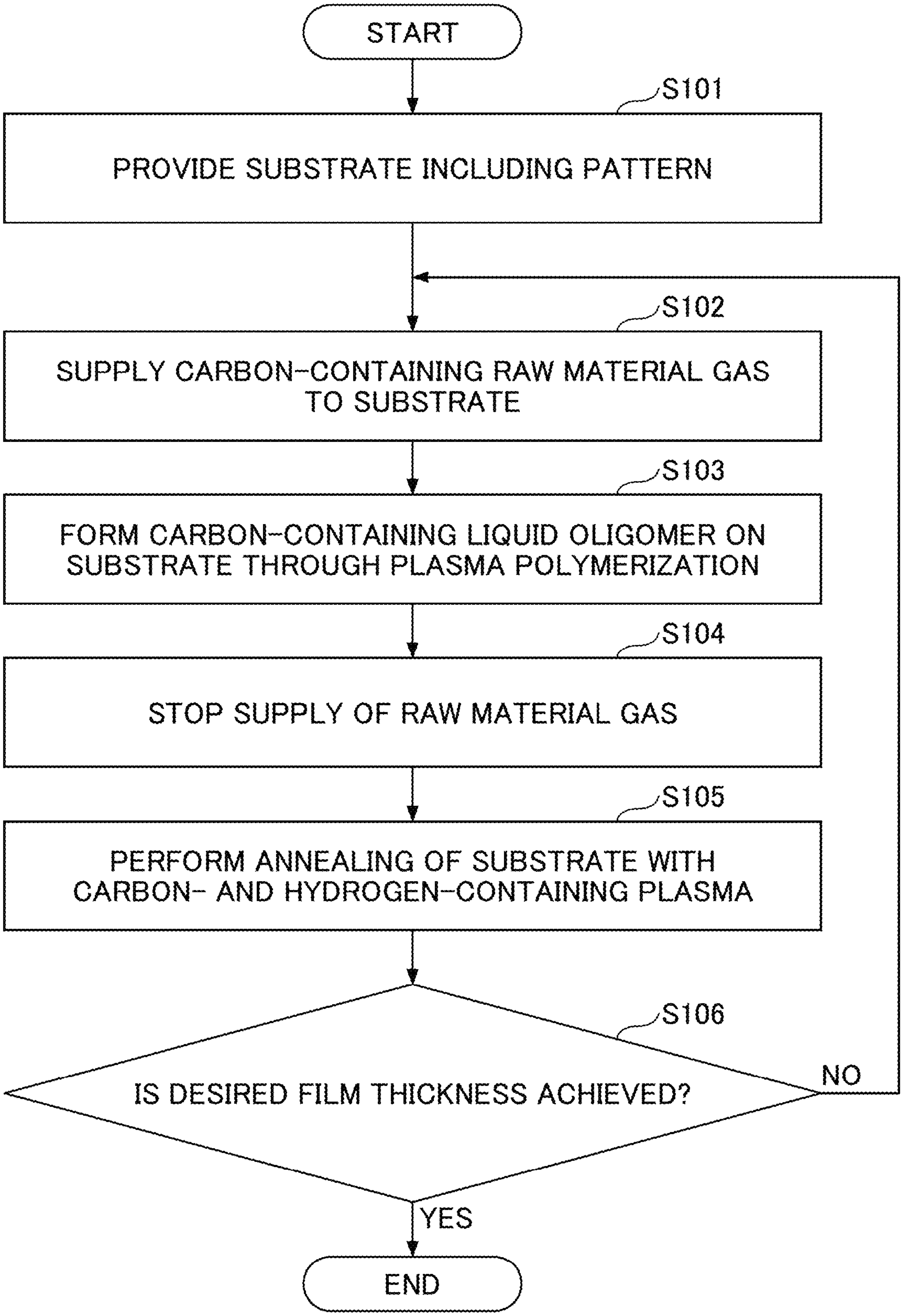
FIG. 1 is a flowchart illustrating an example of a method of forming a carbon-containing film according to the present embodiment.

In one aspect, the present disclosure provides a substrate-processing method for suppressing a decrease in the carbon concentration of a carbon-containing film.

Hereinafter, embodiments of the present disclosure will be described with reference to the drawings. In the drawings, the same components are denoted by the same reference numerals, and redundant description thereof may be omitted.

Method of Forming Carbon-Containing Film

An example of the method of forming the carbon-containing film according to the present embodiment will be described with reference to FIG. 1. FIG. 1 is a flowchart illustrating an example of the method of forming the carbon-containing film according to the present embodiment. The following description will be made taking, as an example, a method of embedding the carbon-containing film in a recess of a substrate, such as a trench or the like.

Here, the carbon-containing film is a film containing carbon (C). The carbon-containing film is a film containing at least one of silicon (Si) or boron (B). The carbon-containing film may also contain oxygen (O), nitrogen (N), or the like. Specifically, the carbon-containing film may be SiC, SiOC, SiOCN, SiCN, BCN, or the like.

In step S101, a substrate W having a recessed pattern at the substrate surface is provided. Here, in a processing apparatus 1 (see FIG. 13 described below), the substrate W is placed on a stage 3 of the processing apparatus 1.

In step S102, a raw material gas containing carbon is supplied to the substrate. Here, in the processing apparatus 1 (see FIG. 13 described below), a raw material gas is supplied to a process chamber 2 housing the substrate W. Here, the raw material gas contains carbon (C). The raw material gas also contains at least one of silicon (Si) or boron (B). The raw material gas also contains at least one of a Si—C bond or a B—C bond.

Specifically, as the raw material gas, methyltrimethoxysilane (MTMOS: $Si(OCH_3)_3CH_3$), methyltriethoxysilane (MTEOS: $Si(OC_2H_5)_3CH_3$), dimethyldimethoxysilane (DMDMOS: $Si(OCH_3)_2(CH_3)_2$), hexamethyldisiloxane (HMDS: $Si(CH_3)_3OSi(CH_3)_3$), tetramethylcyclotetrasiloxane (TMCTS: $(HSiCH_3O)_4$), trimethylboron (TMB: $B(CH_3)_3$), or the like can be used.

In step S103, a flowable oligomer containing carbon is formed on the substrate through plasma polymerization. Here, a plasma is generated by supply of a first power, and the raw material gas containing carbon is plasma-polymerized through plasma enhanced chemical vapor deposition (PECVD), thereby forming a flowable oligomer (liquid oligomer) containing carbon. The temperature at which the flowable oligomer is formed is a first temperature. Specifically, the first temperature is preferably in the range of from −50 degrees Celsius (° C.) through 100° C. The formed flowable oligomer containing carbon is deposited on the substrate surface, and flows into the recess.

In step S104, the generation of the plasma is stopped, and the supply of the raw material gas is stopped.

In step S105, the substrate is modified with a carbon- and hydrogen-containing plasma and is subjected to annealing. In this step, the processing apparatus 1 (see FIG. 13 described below) supplies a carbon- and hydrogen-containing modification gas to the process chamber 2 housing the substrate W, generates a plasma of the modification gas by supply of a second power, and exposes the substrate to the plasma of the modification gas. Note that the processing apparatus in which step S105 is performed may be different from the processing apparatus 1 in which step S102 is performed. The treatment of step S105 modifies the flowable oligomer, thereby forming a carbon-containing film. The temperature at which the flowable oligomer is modified is a second temperature that is higher than the first temperature. Specifically, the second temperature is preferably in the range of from 100° C. through 700° C. The second power is higher than the first power. This is because the first power is desirably lower in order to suppress excessive decomposition of the oligomer and maintain flowability thereof, and the second power is desirably higher than the first power in order to cure and modify the flowable oligomer. Also, the frequency of the power for generating a plasma is preferably in the range of from 13 megahertz (MHz) through 2.45 gigahertz (GHz). By modifying the flowable oligomer with the plasma at the second temperature, a modified carbon-containing film is formed while curing the flowable oligomer and at the same time suppressing loss of carbon in the flowable oligomer. Thereby, the flowable oligomer flowing into the recess is cured, and the carbon-containing film is embedded in the recess.

Here, the modification gas contains carbon (C) and hydrogen (H). The modification gas may also contain a hydrocarbon gas and a hydrogen-containing gas. The hydrocarbon gas may be $C_xH_y$ (x and y are natural numbers equal to or greater than 1), such as methane, ethane, propane, ethylene, propylene, acetylene, and the like. The hydrogen-containing gas may be $H_2$.

The ratio of hydrogen to carbon in the modification gas may be determined in accordance with the carbon concentration of the carbon-containing film to be formed. The ratio of the hydrogen-containing gas to the hydrocarbon gas in the modification gas is preferably in the range of from 1:2 through 1:200. The hydrocarbon gas may be determined in accordance with the carbon concentration of the carbon-containing film to be formed. For example, when the carbon concentration of the carbon-containing film is low, the modification with the plasma is performed using propane, which has more carbon atoms. For example, when the carbon concentration of the carbon-containing film is high, the modification with the plasma is performed using methane, which has fewer carbon atoms. Thereby, the carbon-containing film can be modified while suppressing the occurrence of a film-forming mode or an etching mode during the modification with the plasma of the modification gas.

The modification gas may further include a nitrogen-containing gas in addition to the hydrocarbon gas and the hydrogen-containing gas. The nitrogen-containing gas may be $N_2$, $NH_3$, $N_2O$, or the like. The nitrogen-containing gas is used to include nitrogen in the carbon-containing film. Thereby, the film density of the carbon-containing film can be increased (densified).

The modification gas may further contain a silicon-containing gas. The silicon-containing gas may be silane, disilane, trisilane, tetrasilane, any other high-order silane, or the like. The silicon-containing gas suppresses inclusion of oxygen in the carbon-containing film by removing oxygen remaining in the process chamber 2.

The modification gas may further contain an inert gas. The inert gas may be Ar, He, $N_2$, or the like.

Figure 2B:
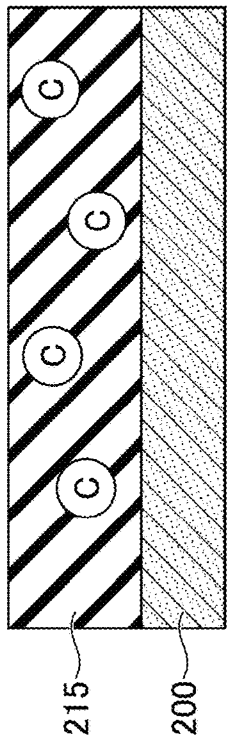
FIGS. 2A and 2B are schematic cross-sectional diagrams of a substrate that schematically illustrate a carbon concentration of a film during modification.
Figure 2A:
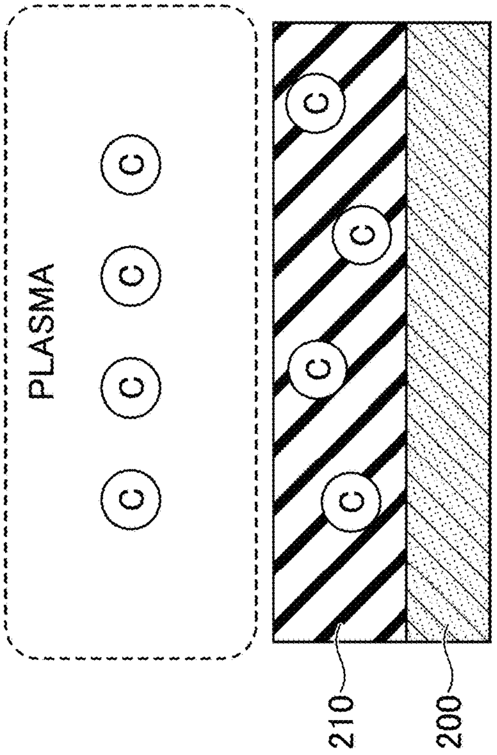

Here, the change in the carbon concentration of the film during the modification of step S105 will be described with reference to FIGS. 2A and 2B. FIGS. 2A and 2B are schematic cross-sectional diagrams of the substrate that schematically illustrate the carbon concentration of the film during the modification.

FIG. 2A is a schematic cross-sectional diagram illustrating the state in which the substrate is being subjected to the modification. The substrate includes an underlying layer 200 and a flowable film 210. The flowable film 210 is formed of a flowable oligomer containing carbon (C). Also, the flowable film 210 of the substrate is subjected to the modification with the plasma containing carbon (C).

FIG. 2B is a schematic cross-sectional diagram illustrating the state of the substrate after the modification. By performing the modification with the plasma containing carbon (C), a decrease in the carbon concentration of a carbon-containing film 215 is suppressed. Also, by modifying the flowable film 210 with the plasma containing carbon (C) having an ionization energy lower than hydrogen (H) or nitrogen (N), damage to the carbon-containing film 215 is reduced.

Because the modification gas contains hydrogen (H), deposition of reaction byproducts on the substrate surface is suppressed by the plasma of hydrogen (H).

As illustrated in FIG. 1, in step S106, it is determined whether or not a desired film thickness is achieved. When the desired film thickness is not achieved (step S106: NO), the process flow returns to step S102, and the process of from step S102 through step S105 is repeatedly performed until the desired film thickness is achieved. When the desired film thickness is achieved (step S106: YES), the process flow is ended.

Figure 3:
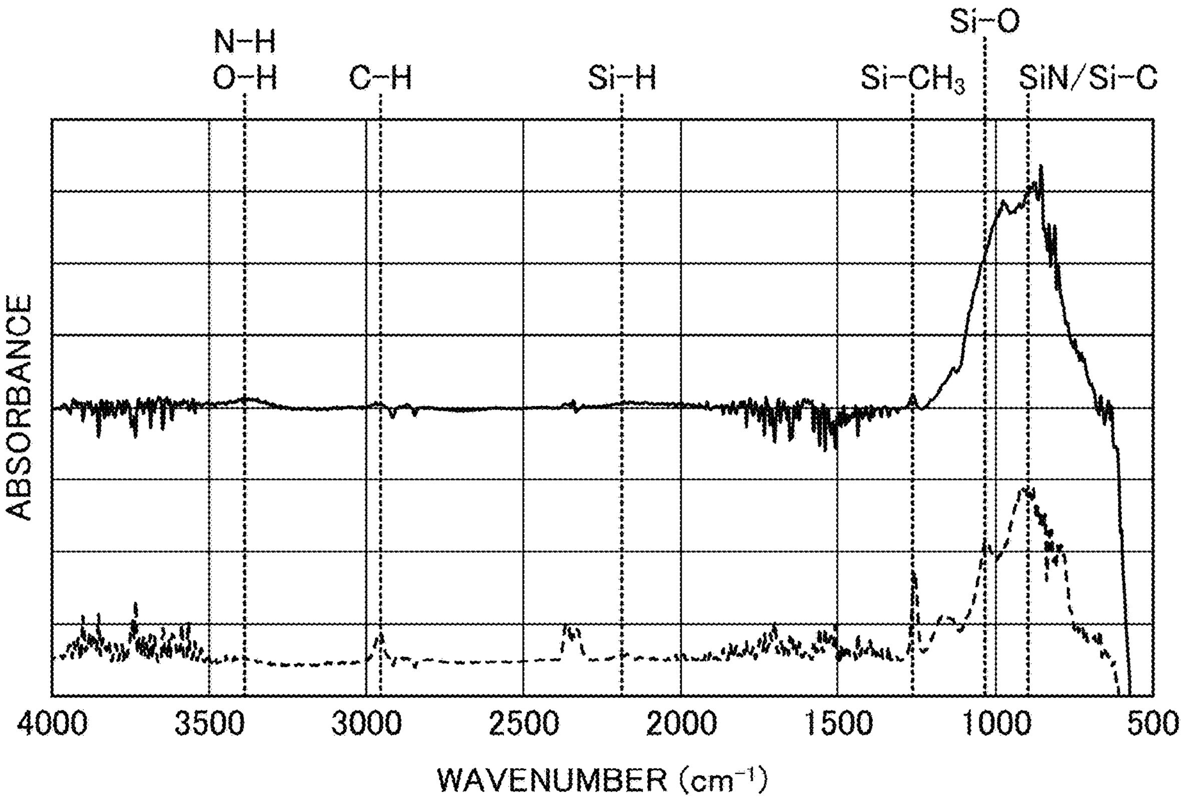
FIG. 3 is a graph illustrating an example of structural analysis results of a flowable film and a carbon-containing film.
Figure 4:
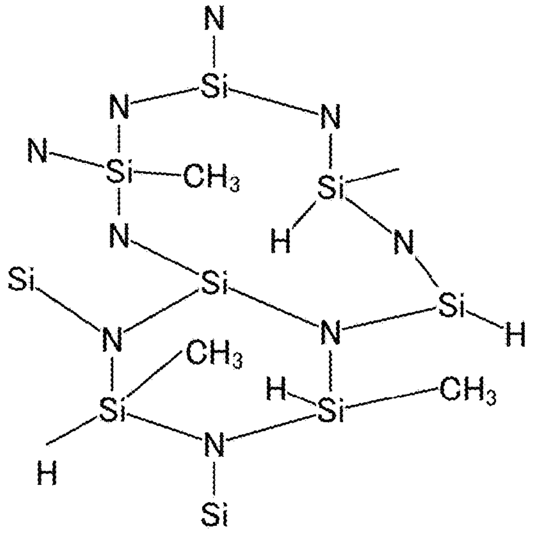
FIG. 4 is a diagram illustrating an example of a chemical structure of the flowable film before the modification.
Figure 5:
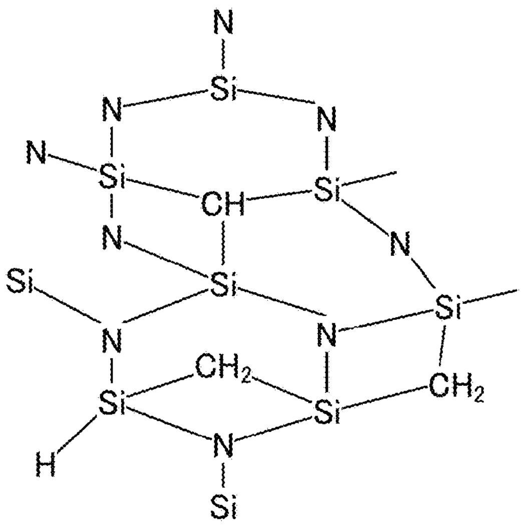
FIG. 5 is a diagram illustrating an example of a chemical structure of the carbon-containing film after the modification.

The structure of the film before and after the modification will be described with reference to FIGS. 3 to 5. FIG. 3 is a graph illustrating an example of structural analysis results of the flowable film 210 and the carbon-containing film 215. Here, the flowable film 210 before the modification and the carbon-containing film 215 after the modification were analyzed through Fourier transform infrared spectroscopy (FT-IR). The dashed line indicates the result of the flowable film 210 before the modification, and the solid line indicates the result of the carbon-containing film 215 after the modification.

For the flowable film 210 (flowable oligomer) before the modification, a peak indicating a C—H bond and a peak indicating a Si—$CH_3$ bond appear. FIG. 4 is a diagram illustrating an example of a chemical structure of the flowable film 210 before the modification.

In the carbon-containing film 215 after the modification, the peak indicating a C—H bond and the peak indicating a Si—$CH_3$ bond decrease, and a peak indicating at least one of a Si—N bond or a Si—C bond (this peak being labelled as "SiN/Si—C" in FIG. 3) increases. FIG. 5 is a diagram illustrating an example of a chemical structure of the carbon-containing film 215 after the modification.

An example of the polymerization reaction is shown by formula (1) below.

$$Si—H+Si—CH_3 \rightarrow Si—CH_2—Si+2H_2\uparrow \quad (1)$$

Thus, by exposing the flowable film 210 to the carbon-containing plasma, the C—H bonds and the Si—$CH_3$ bonds decrease, and the main bonds (the Si—N bonds and the Si—C bonds) increase. As a result, the carbon-containing film 215 is formed.

At the time of subjecting the substrate to the modification with the plasma of the modification gas, it is expected that a carbon film is deposited on the substrate surface using the hydrocarbon gas as a raw material. The deposition of the carbon film will be described with reference to FIGS. 6 to 8.

Figure 6:
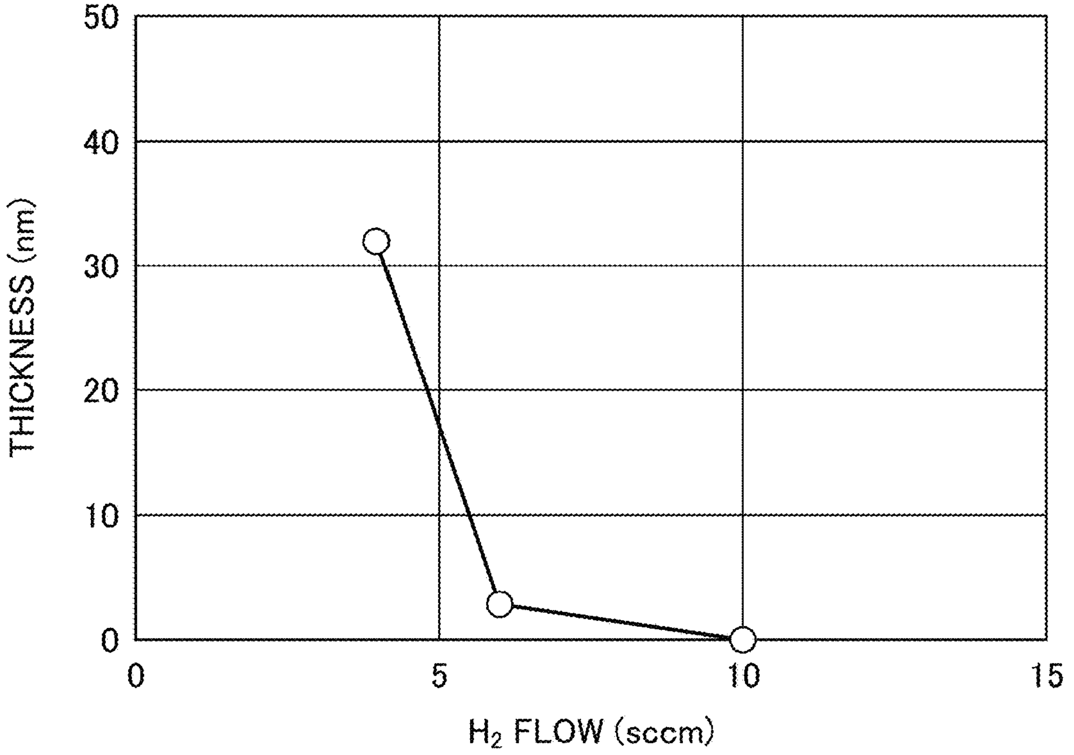
FIG. 6 is an example of a graph illustrating a relationship between a flow rate of a hydrogen-containing gas and a deposition amount of a carbon film.
Figure 7:
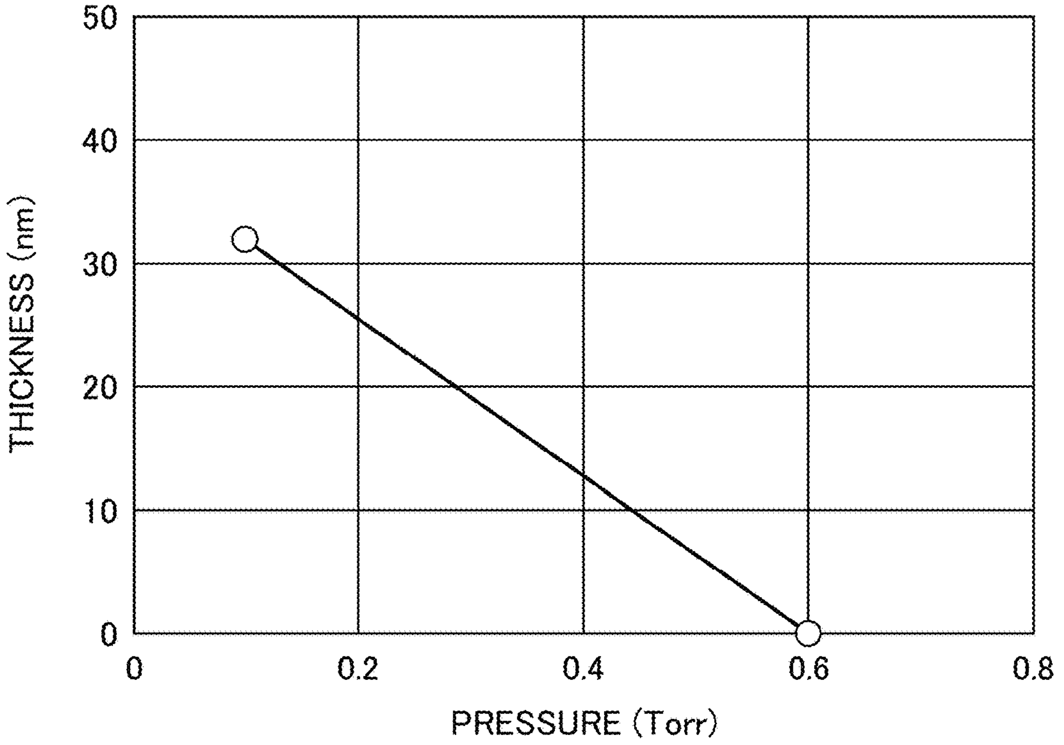
FIG. 7 is an example of a graph illustrating a relationship between a pressure and a deposition amount of a carbon film.
Figure 8:
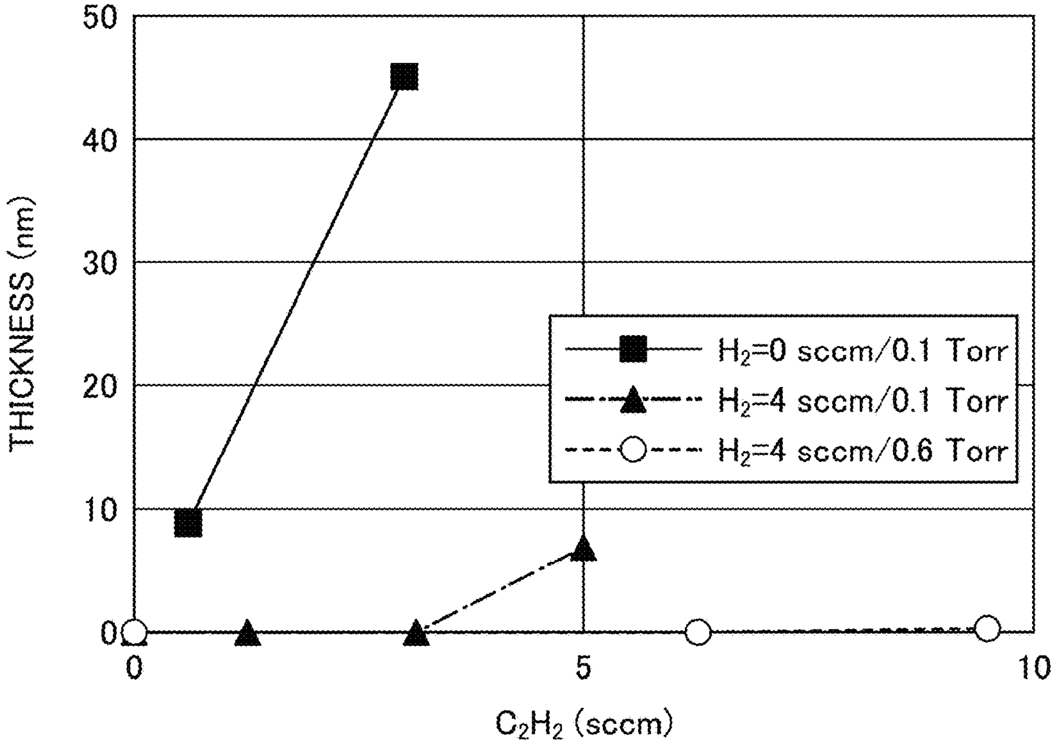
FIG. 8 is an example of a graph illustrating a relationship between a flow rate of a hydrocarbon gas and a deposition amount of a carbon film.

FIG. 6 is an example of a graph illustrating a relationship between the flow rate of the hydrogen-containing gas ($H_2$ gas) and the deposition amount of the carbon film. In FIG. 6, the horizontal axis indicates the flow rate of the hydrogen-containing gas ($H_2$ gas) and the vertical axis indicates the film thickness of the carbon film deposited on the substrate surface. FIG. 7 is an example of a graph illustrating a relationship between the pressure and the deposition amount of the carbon film. In FIG. 7, the horizontal axis indicates the pressure and the vertical axis indicates the film thickness of the carbon film deposited on the substrate surface. FIG. 8 is an example of a graph illustrating a relationship between the flow rate of the hydrocarbon gas ($C_2H_2$ gas) and the deposition amount of the carbon film. In FIG. 8, the horizontal axis indicates the flow rate of the hydrocarbon gas ($C_2H_2$ gas) and the vertical axis indicates the film thickness of the carbon film deposited on the substrate surface.

As illustrated in FIG. 6, the deposition amount of the carbon film decreases as the amount of the hydrogen-containing gas ($H_2$ gas) increases. Meanwhile, the deposition amount of the carbon film increases as the amount of the hydrogen-containing gas ($H_2$ gas) decreases.

As illustrated in FIG. 7, the deposition amount of the carbon film decreases as the pressure increases.

Meanwhile, the deposition amount of the carbon film increases as the pressure decreases.

As illustrated in FIG. 8, when the flow rate of the hydrogen-containing gas ($H_2$ gas) is 0 sccm and the pressure is 0.1 Torr, the deposition amount of the carbon film increases as the flow rate of the hydrocarbon gas ($C_2H_2$ gas) increases. When the flow rate of the hydrogen-containing gas ($H_2$ gas) is 4 sccm and the pressure is 0.1 Torr, the deposition amount of the carbon film increases as the flow rate of the hydrocarbon gas ($C_2H_2$ gas) increases. Meanwhile, when the flow rate of the hydrogen-containing gas ($H_2$ gas) is 4 sccm and the pressure is 0.6 Torr, the deposition amount of the carbon film does not increase even if the flow rate of the hydrocarbon gas ($C_2H_2$ gas) increases.

Thus, as illustrated in FIGS. 6 to 8, by adjusting the flow rate or the pressure of the hydrogen-containing gas ($H_2$ gas), and the flow rate of the hydrocarbon gas ($C_2H_2$ gas), it is possible to prevent deposition of the carbon film on the surface of the carbon-containing film 215 by virtue of the etching effect of the hydrogen plasma.

As described above, by performing the modification with the carbon- and hydrogen-containing plasma, it is possible to prevent deposition of the carbon film, suppress a decrease in the carbon concentration of the film, modify the flowable oligomer, and form the carbon-containing film.

Figure 9:
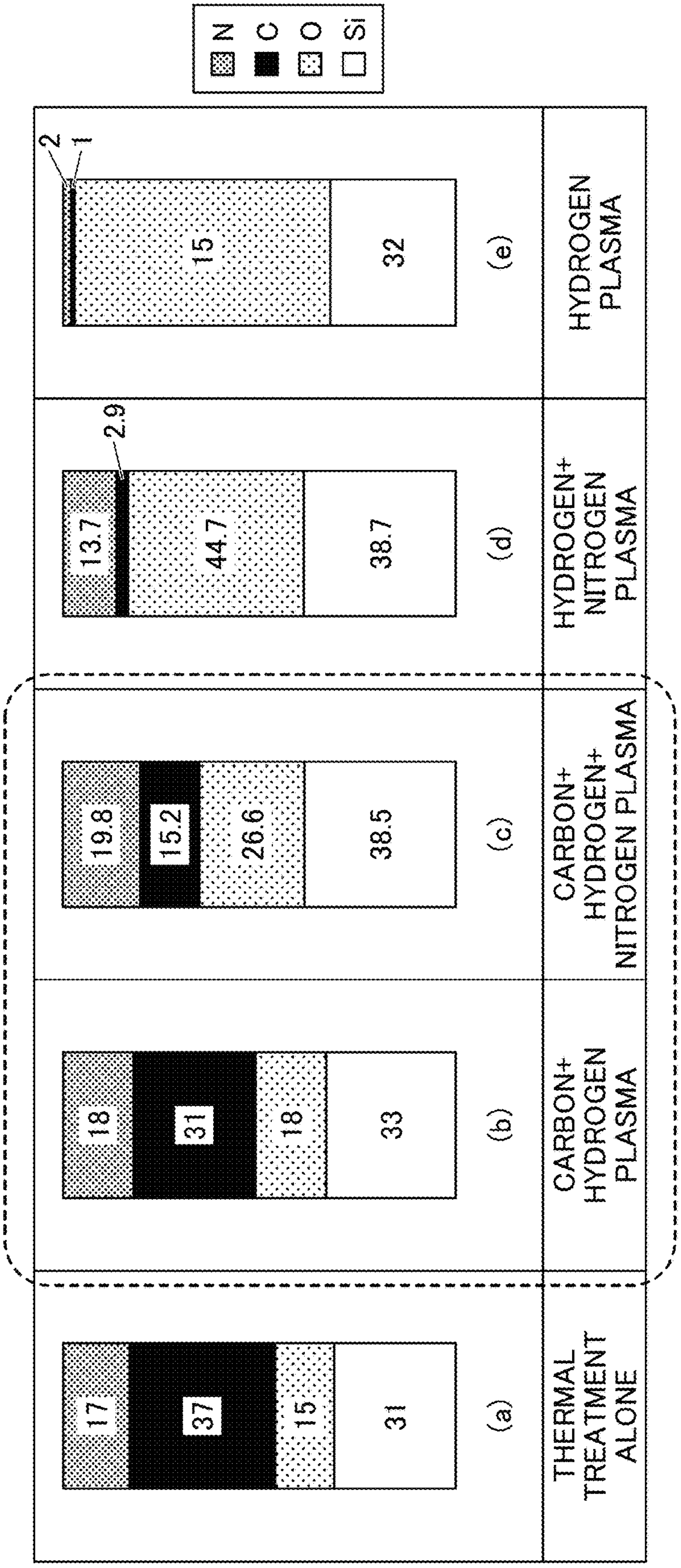
FIG. 9 is a graph illustrating an example of an atomic concentration distribution.

FIG. 9 is a graph illustrating an example of an atomic concentration distribution. In FIG. 9, (a) shows the atomic concentration distribution of the carbon-containing film in which the flowable oligomer is subjected to a thermal treatment alone, (b) shows the atomic concentration distribution of the carbon-containing film in which the flowable oligomer is subjected to annealing using a plasma of carbon and hydrogen, (c) shows the atomic concentration distribution of the carbon-containing film in which the flowable oligomer is subjected to annealing using a plasma of carbon, hydrogen, and nitrogen, (d) shows the atomic concentration distribution of the carbon-containing film in which the flowable oligomer is subjected to annealing using a plasma of hydrogen and nitrogen, and (e) shows the atomic concentration distribution of the carbon-containing film in which the flowable oligomer is subjected to annealing using a hydrogen plasma.

When the plasma of hydrogen and nitrogen is used as illustrated in (d), the carbon of the film reacts with the hydrogen plasma, and is released as $CH_4$. Also, the carbon of the film reacts with the nitrogen plasma, and is released as $CH_3NH_2$. As a result, the carbon (C) of the film is greatly reduced in (d) compared to (a).

When the hydrogen plasma is used as illustrated in (e), the carbon of the film reacts with the hydrogen plasma, and is released as $CH_4$. As a result, the carbon (C) of the film is greatly reduced in (e) compared to (a).

Meanwhile, when the plasma of carbon and hydrogen is used as illustrated in (b), a decrease in the carbon (C) of the film can be greatly suppressed. In other words, the carbon concentration of the film can be increased in (b) compared to (e).

When the plasma of carbon, hydrogen, and nitrogen is used as illustrated in (c), a decrease in the carbon (C) of the film can be greatly suppressed. In other words, the carbon concentration of the film can be increased in (c) compared to (d). Also, the nitrogen concentration of the film can be increased in (c) compared to (b).

Figure 10:
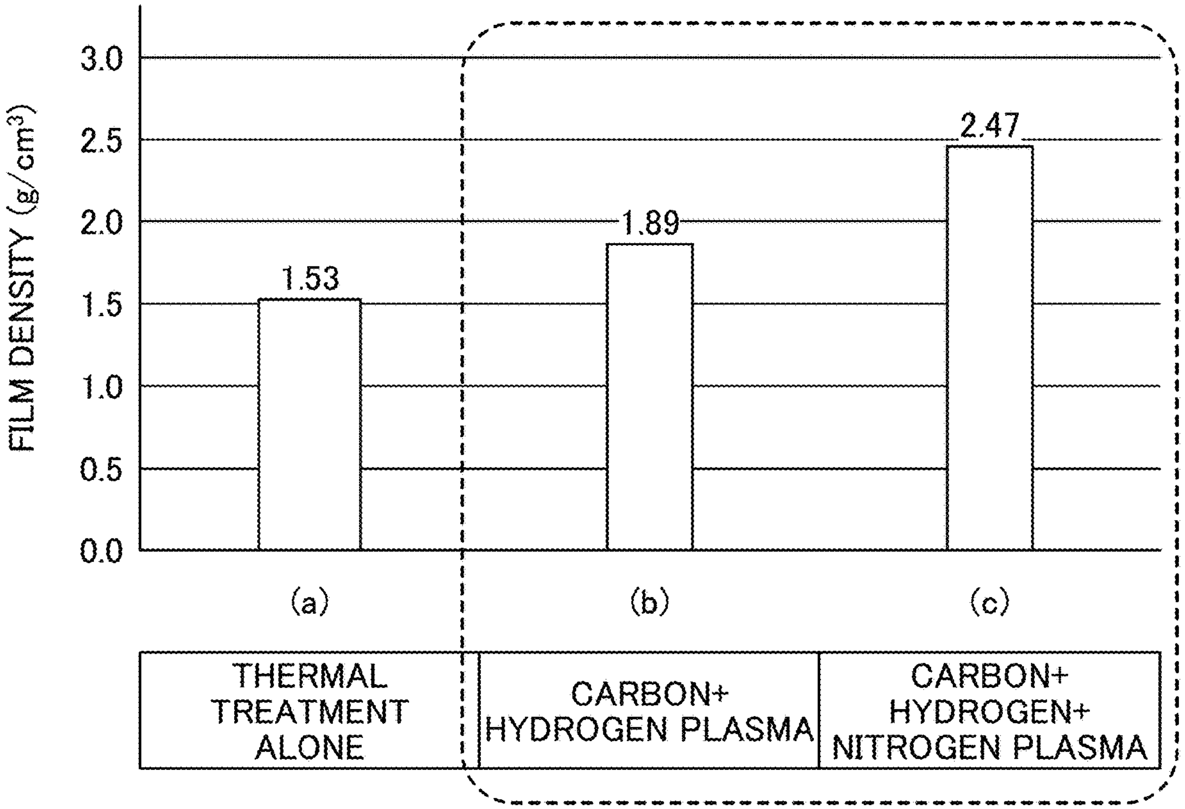
FIG. 10 is a graph illustrating an example of a film density.

FIG. 10 is a graph illustrating an example of a film density. In FIG. 10, (a) shows the film density of the carbon-containing film in which the flowable oligomer is subjected to a thermal treatment alone, (b) shows the film density of the carbon-containing film in which the flowable oligomer is subjected to annealing using a plasma of carbon and hydrogen, and (c) shows the film density of the carbon-containing film in which the flowable oligomer is subjected to annealing using the plasma of carbon, hydrogen, and nitrogen.

The film density is increased in (b) and (c) compared to (a). As a result, electrical characteristics (insulating properties) and etching resistance of the carbon-containing film are improved.

Figure 11B:
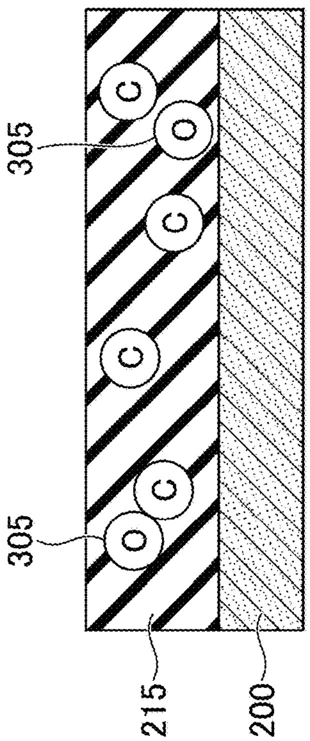
FIGS. 11A and 11B are schematic cross-sectional diagrams of a substrate that schematically illustrate a carbon concentration of a film in a comparative example.
Figure 11A:
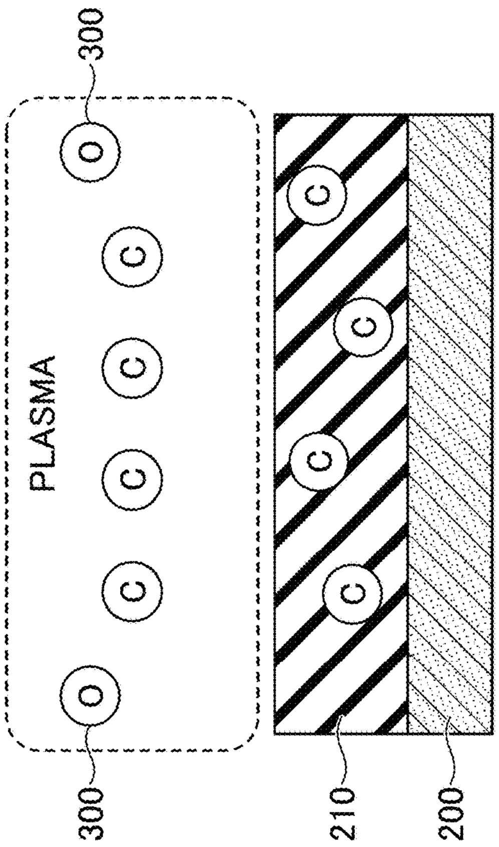
Figure 12A:
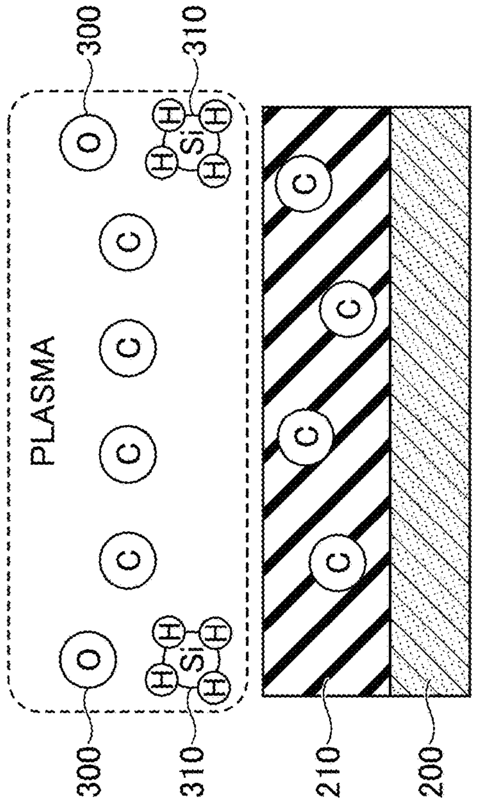
FIGS. 12A and 12B are schematic cross-sectional diagrams of a substrate that schematically illustrate a carbon concentration of a film formed by addition of a silicon-containing gas.
Figure 12B:
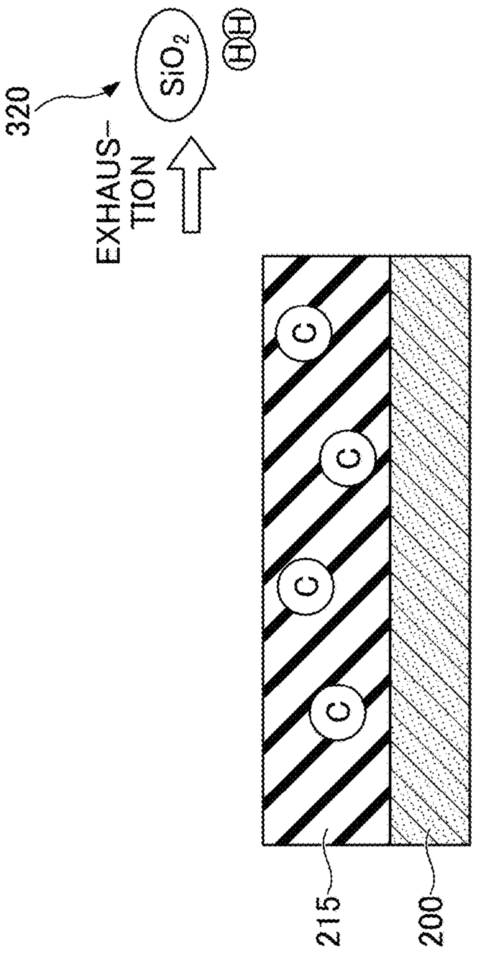

Next, the influence of oxygen remaining in the process chamber will be described with reference to FIGS. 11A and 11B and FIGS. 12A and 12B. FIGS. 11A and 11B are schematic cross-sectional diagrams of the substrate that schematically illustrate the carbon concentration of the film in a comparative example. FIGS. 12A and 12B are schematic cross-sectional diagrams of the substrate that schematically illustrate the carbon concentration of the film formed by addition of a silicon-containing gas.

As illustrated in FIG. 11A, oxygen 300 remaining in the process chamber during the modification is included. Therefore, as illustrated in FIG. 11B, oxygen 305 is included in the carbon-containing film 215. As a result, the oxygen concentration of the film may be increased. Also, there is a possibility that the included oxygen 305 is bonded to carbon in the film and then released, and the carbon concentration of the film decreases.

Meanwhile, as illustrated in FIG. 12A, the modification gas contains a silicon-containing gas 310 ($SiH_4$ in this case). As a result, as illustrated in FIG. 12B, the oxygen 300 reacts with the silicon-containing gas 310 and forms reaction products 320 ($SiO_2$, $H_2$) and the reaction products 320 are discharged outward of the process chamber by the flow of the gas. This suppresses inclusion of the oxygen 300 in the carbon-containing film 215. Thereby, an increase in the oxygen concentration of the film is suppressed. Also, a release of the carbon in the film is suppressed, and thus a decrease in the carbon concentration of the film is suppressed.

Processing Apparatus 1

Figure 13:
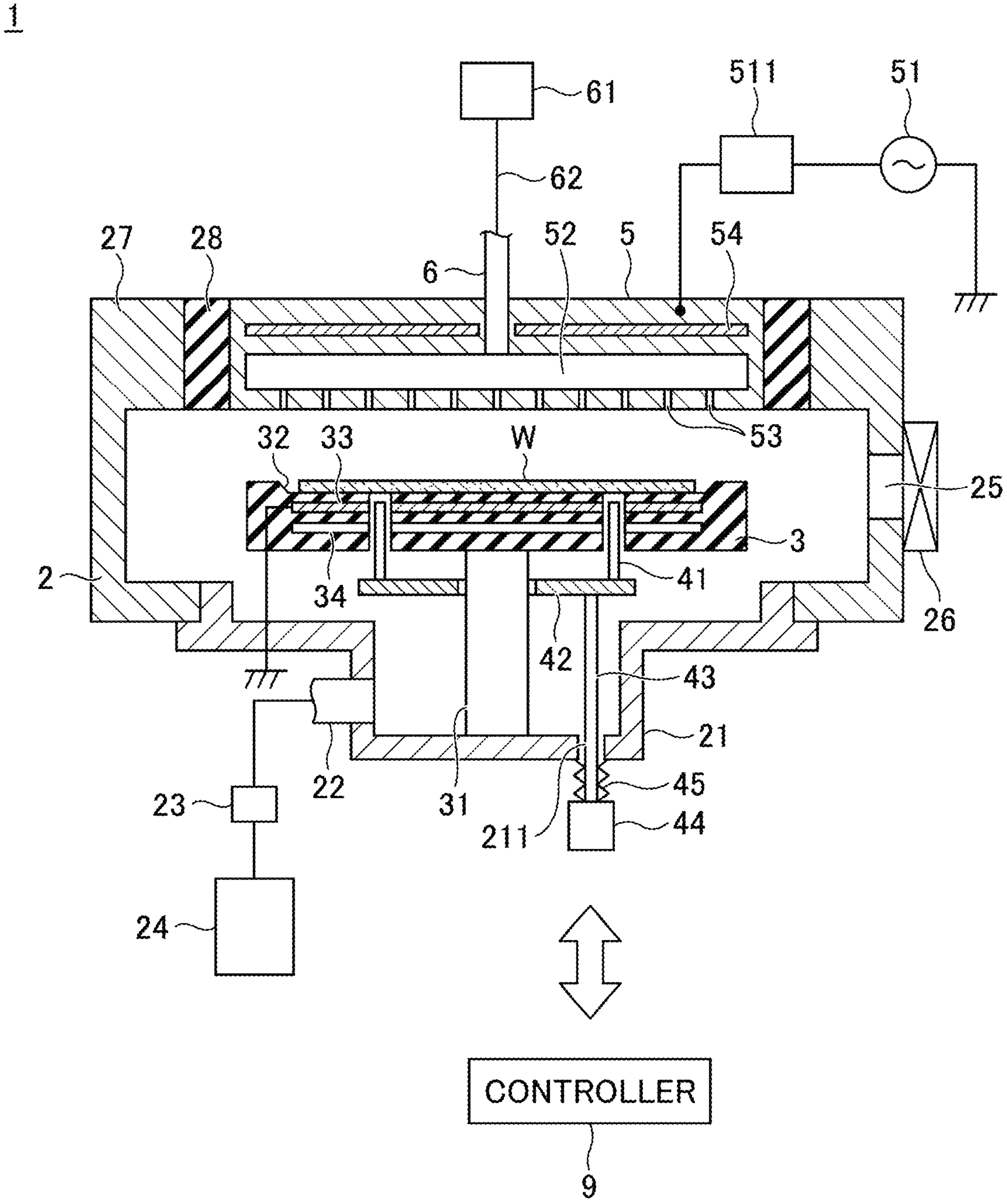
FIG. 13 is a diagram illustrating an example of a processing apparatus.

Next, an example of the processing apparatus 1 configured to form the carbon-containing film 215 having a desired film thickness by repeatedly performing: the steps of forming the flowable film 210 (S102 through S104); and the step of modifying the flowable film 210 and forming the carbon-containing film 215 (S105) will be described with reference to FIG. 13. FIG. 13 is a diagram illustrating an example of the processing apparatus 1. The steps of forming the flowable film 210 (S102 through S104) and the step of forming the carbon-containing film 215 (S105) may be performed in the same process chamber 2 or in different process chambers 2.

The processing apparatus 1 includes the airtight process chamber 2 having a substantially cylindrical shape. An exhaust chamber 21 is provided at the center area of the bottom wall of the process chamber 2.

The exhaust chamber 21 has, for example, a substantially cylindrical shape that projects downward. An exhaust channel 22 is connected to the exhaust chamber 21, for example, to a side surface of the exhaust chamber 21.

An exhauster 24 is connected to the exhaust channel 22 via a pressure adjuster 23. The pressure adjuster 23 includes a pressure adjusting valve, such as a butterfly valve or the like. The exhaust channel 22 is configured to reduce the internal pressure of the process chamber 2 by the effect of the exhauster 24. A delivery port 25 is provided at a side surface of the process chamber 2. The delivery port 25 is configured to be openable and closable by the effect of a gate valve 26. The delivery of the substrate W between the interior of the process chamber 2 and an unillustrated delivery chamber is performed through the delivery port 25.

The process chamber 2 is provided therein with the stage 3 configured to hold the substrate W so as to be substantially horizontal. The stage 3 is formed in a substantially circular shape in a plan view, and is supported by a support 31. A substantially circular recess 32 configured to receive the substrate W having a diameter of, for example, 300 millimeters (mm) is formed at the surface of the stage 3. The recess 32 has an inner diameter that is slightly larger than the diameter of the substrate W (e.g., from about 1 mm through about 4 mm). The depth of the recess 32 is, for example, substantially the same as the thickness of the substrate W. The stage 3 is formed of a ceramic material, such as aluminum nitride (AlN) or the like. The stage 3 may be formed of a metal material, such as nickel (Ni) or the like. Instead of the recess 32, a guide ring configured to guide the substrate W may be provided at the circumferential portion of the surface of the stage 3.

A lower electrode 33 that is grounded, for example, is embedded in the stage 3. A temperature controller 34 is embedded below the lower electrode 33. The temperature controller 34 is configured to adjust the substrate W placed on the stage 3 to a set temperature (i.e., the first temperature in the steps of forming the flowable film 210, or the second temperature in the step of forming the carbon-containing film 215 by modifying the flowable film 210) in accordance with a control signal from a controller 9. When the stage 3 is entirely formed of a metal, the entirety of the stage 3 functions as a lower electrode. Thus, the lower electrode 33 need not be embedded in the stage 3. The stage 3 is provided with a plurality of (e.g., three) raising and lowering pins 41 configured to hold and raise/lower the substrate W placed on the stage 3. The material of the raising and lowering pins 41 may be a ceramic, such as alumina ($Al_2O_3$) and the like, or may be quartz or the like. The lower ends of the raising and lowering pins 41 are attached to a support plate 42. The support plate 42 is connected to a raising and lowering mechanism 44 provided externally of the process chamber 2 via a raising and lowering shaft 43.

The raising and lowering mechanism 44 is provided, for example, below the exhaust chamber 21. A bellows 45 is provided between: an opening 211 for the raising and lowering shaft 43 formed in the lower surface of the exhaust chamber 21; and the raising and lowering mechanism 44. The support plate 42 may have such a shape as to rise and lower without interfering with the support 31 of the stage 3. The raising and lowering pins 41 are configured to be able to rise and lower by the raising and lowering mechanism 44 between the upper space of the surface of the stage 3 and the lower space of the surface of the stage 3. In other words, the raising and lowering pins 41 are configured to project from the upper surface of the stage 3.

A top wall 27 of the process chamber 2 is provided with a gas supply 5 via an insulating member 28. The gas supply 5 forms an upper electrode and faces the lower electrode 33. An RF power supply 51 is connected to the gas supply 5 via a matching device 511. The frequency of the RF power supply 51 is, for example, from 13 MHZ through 2.45 GHZ. By supplying the RF power from the RF power supply 51 to the upper electrode (gas supply 5), an RF electric field is generated between the upper electrode (gas supply 5) and the lower electrode 33. The gas supply 5 includes a hollow gas diffusion chamber 52. The lower surface of the gas diffusion chamber 52 is provided with numerous holes 53 through which the processing gas is dispersed and supplied to the process chamber 2. The numerous holes 53 are arranged, for example, at equal intervals. A heater 54 is embedded in the gas supply 5, for example, upward of the gas diffusion chamber 52. The heater 54 is heated to a set temperature by supply of power from an unillustrated power supply in accordance with a control signal from the controller 9.

The gas diffusion chamber 52 is provided with a gas supply channel 6. The gas supply channel 6 is in communication with the gas diffusion chamber 52. A gas source 61 is connected via a gas line 62 to the gas supply channel 6 on the upstream side of the gas supply channel 6. The gas source 61 includes, for example, an unillustrated supply source of various processing gases, an unillustrated mass flow controller, and an unillustrated valve. The various processing gases include the above-described raw material gas and the above-described modification gas. The various processing gases are introduced into the gas diffusion chamber 52 from the gas source 61 through the gas line 62.

The processing apparatus 1 includes the controller 9. The controller 9 is, for example, a computer, and includes a central processing unit (CPU), a random access memory (RAM), a read only memory (ROM), an auxiliary storage, and the like. The CPU is driven in accordance with programs stored in the ROM or the auxiliary storage, and controls how the processing apparatus 1 is driven. The controller 9 may be provided internally or externally of the processing apparatus 1. When the controller 9 is provided externally of the processing apparatus 1, the controller 9 can control the processing apparatus 1 by a communication means, such as wired communication, wireless communication, or the like.

The processing apparatus 1 illustrated in FIG. 13 has been described with reference to a parallel-plate type single-wafer processing apparatus. However, this is by no means a limitation. The processing apparatus 1 may be a plasma processing apparatus using microwaves, a plasma processing apparatus using VHF, or the like.

Although a substrate processing method for forming a carbon-containing film in a recess has been described above, the present disclosure is not limited to the above embodiments and the like, and various modifications and improvements are possible within the scope of the gist of the present disclosure recited in the claims.

According to one aspect of the present disclosure, it is possible to provide a substrate-processing method for suppressing a decrease in the carbon concentration of a carbon-containing film.

What is claimed is:

1. A substrate-processing method, comprising:

a) forming a flowable oligomer on a substrate, the flowable oligomer containing carbon; and b) after completion of the formation of the flowable oligomer, performing a plasma modification process using a modification gas containing carbon and hydrogen, thereby modifying the flowable oligomer and forming a carbon-containing film.

2. The substrate-processing method according to claim 1, wherein the modification gas contains a hydrocarbon gas and a hydrogen-containing gas.

3. The substrate-processing method according to claim 2, wherein a ratio of the hydrogen-containing gas to the hydrocarbon gas in the modification gas is in a range of from 1:2 through 1:200.

4. The substrate-processing method according to claim 2, wherein the hydrocarbon gas is methane, ethane, propane, ethylene, propylene, or acetylene.

5. The substrate-processing method according to claim 2, wherein the hydrogen-containing gas is $H_2$.

6. The substrate-processing method according to claim 2, wherein the modification gas further contains a nitrogen-containing gas.

7. The substrate-processing method according to claim 6, wherein the nitrogen-containing gas is $N_2$, $NH_3$, or $N_2O$.

8. The substrate-processing method according to claim 2, wherein the modification gas further contains a silicon-containing gas.

9. The substrate-processing method according to claim 8, wherein the silicon-containing gas is silane, disilane, trisilane, tetrasilane, or a high-order silane.

10. The substrate-processing method according to claim 2, wherein the modification gas further contains an inert gas.

11. The substrate-processing method according to claim 1, wherein a) includes supplying a raw material gas containing carbon, generating a plasma by supply of a first power, and plasma-polymerizing the raw material gas containing carbon through plasma enhanced chemical vapor deposition, thereby forming the flowable oligomer containing carbon.

12. The substrate-processing method according to claim 11, wherein b) includes supplying the modification gas containing carbon and hydrogen, generating a plasma of the modification gas by supply of a second power that is higher than the first power, and exposing the substrate to the plasma of the modification gas, thereby modifying the flowable oligomer.

13. The substrate-processing method according to claim 1, wherein the substrate-processing method repeatedly performs a) and b).

14. The substrate-processing method according to claim 1, wherein the carbon-containing film is SiC, SiOC, SiOCN, SiCN, or BCN.

* * * * *